United States Patent
Ambrose et al.

(10) Patent No.: US 7,268,176 B2
(45) Date of Patent: Sep. 11, 2007

(54) ADDITIVES FOR IMPARTING MAR AND SCRATCH RESISTANCE AND COMPOSITIONS COMPRISING THE SAME

(75) Inventors: Ronald R. Ambrose, Pittsburgh, PA (US); Shengkui Hu, Baden, PA (US); William H. Retsch, Jr., Castle Shannon, PA (US); Kristin M. Bartlett, Pittsburgh, PA (US); Richard J. Sadvary, Pittsburgh, PA (US); Masayuki Nakajima, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 353 days.

(21) Appl. No.: 10/317,971

(22) Filed: Dec. 12, 2002

(65) Prior Publication Data

US 2004/0116585 A1 Jun. 17, 2004

(51) Int. Cl.
*C08K 5/5419* (2006.01)
(52) U.S. Cl. ............... 524/262; 524/265; 524/267; 524/493; 524/588; 524/597
(58) Field of Classification Search ............ 524/492, 524/847, 860, 262, 265, 267, 493, 588, 597
See application file for complete search history.

(56) References Cited

U.S. PATENT DOCUMENTS

| | | | | |
|---|---|---|---|---|
| 3,957,718 A | * | 5/1976 | Pochert et al. | 524/723 |
| 4,732,787 A | * | 3/1988 | Vantillard et al. | 427/386 |
| 5,068,063 A | * | 11/1991 | Tremper, III | 252/519.34 |
| 5,853,809 A | * | 12/1998 | Campbell et al. | 427/407.1 |
| 6,225,434 B1 | * | 5/2001 | Sadvary et al. | 427/407.1 |
| 6,387,519 B1 | * | 5/2002 | Anderson et al. | 428/447 |
| 6,586,483 B2 | * | 7/2003 | Kolb et al. | 521/91 |

FOREIGN PATENT DOCUMENTS

WO 01/09231 * 2/2001

OTHER PUBLICATIONS

Abstract WO 01/09231.*

* cited by examiner

*Primary Examiner*—Margaret G. Moore
(74) *Attorney, Agent, or Firm*—Diane R. Meyers; Donald R. Palladino

(57) ABSTRACT

Additives comprising dispersed silica nanoparticles are disclosed. The silica nanoparticles are dispersed in an aminoplast, such as a modified aminoplast formed from the reaction between an aminoplast, a modifying component, and optionally a siloxane. The resulting additives can be added to coating compositions to provide improved mar and/or scratch resistance.

23 Claims, No Drawings

ADDITIVES FOR IMPARTING MAR AND SCRATCH RESISTANCE AND COMPOSITIONS COMPRISING THE SAME

FIELD OF THE INVENTION

The present invention relates to novel additives for coating compositions that provide improved mar and/or scratch resistance to the cured coating. More specifically, the improved resistance is achieved by incorporating the additives into a film-forming resin.

BACKGROUND OF THE INVENTION

"Color-plus-clear" coating systems involving the application of a colored or pigmented basecoat to a substrate followed by application of a transparent or clearcoat over the basecoat have become increasingly popular as original finishes for a number of consumer products including, for example, cars and floor coverings such as ceramic tiles and wood flooring. The color-plus-clear coating systems have outstanding appearance properties such as gloss and distinctness of image, due in large part to the clear coat.

"One coat" systems comprising a one coat color layer are applied themselves as the topcoat. One coat systems are frequently used for household appliances, lawn and garden equipment, interior fixtures, and the like.

Many of the coatings used in both the color-plus-clear systems and one-coat systems are powder coatings. In recent years, powder coatings have become increasingly popular because these coatings are inherently low in volatile organic content (VOC). The low VOC significantly reduces air emissions during application and curing as compared to liquid coatings. Liquid coatings are still used in many systems, however, particularly those wherein solvent emissions are permitted. For example, the coating of elastomeric automotive parts is often done by spraying liquid compositions.

Topcoat film-forming compositions, such as the protective and/or decorative one coats for household appliances and the transparent clearcoat in color-plus-clear coating systems for automotive applications, are subject to defects that occur during the assembly process and damage from both the environment and normal use of the end product. Paint defects that occur during assembly include the paint layer being too thick or too thin, "fish eyes" or craters, and under-cured or over-cured paint; these defects can affect the color, brittleness, solvent resistance and mar and scratch performance of the coating. Damaging environmental factors include acidic precipitation, exposure to ultraviolet radiation from sunlight, high relative humidity and high temperatures; these factors can also result in compromised performance. Normal use of consumer products will often lead to marring, scratching and/or chipping of the surface due to contact with hard objects, contact with brushes and/or abrasive cleansers during normal cleaning processes, and the like.

Thus, there is a need in the coatings art for topcoats having good scratch and mar resistance.

SUMMARY OF THE INVENTION

The present invention is directed to an additive for use in coating compositions, including both liquid and powder coating compositions. The additive itself can be in either liquid or powder form, and generally comprises aminoplast compounds and silica nanoparticles; the nanoparticulate silica is dispersed throughout the aminoplast. Coating compositions comprising these additives and methods for using these compositions are also within the scope of the invention, as are articles coated according to these methods.

Historically, incorporation of silica nanoparticles into coatings, especially powder coatings, has been very hard to achieve, as the silica particles tend to form agglomerates when mixed into the coating. These agglomerates are relatively ineffective in imparting mar and/or scratch resistance to a coating, and can also negatively affect the appearance of the coating. It has now been surprisingly discovered that silica nanoparticles can be introduced to a coating composition through an aminoplast dispersant; the aminoplast dispersant minimizes, if not prevents, the agglomeration of the silica, thereby allowing it to be dispersed both throughout the aminoplast itself and the coating composition. Incorporation of the present additives into compositions comprising film-forming resins results in coatings having enhanced mar and/or scratch resistance as compared with the same coatings lacking these additives. According to the present invention, coatings can be formulated with these improved mar and/or scratch characteristics without significantly affecting the appearance or other mechanical properties of the coatings.

"Mar" and "scratch" refer herein to physical deformations resulting from mechanical or chemical abrasion. "Mar resistance" is a measure of a material's ability to resist appearance degradation caused by small scale mechanical stress. "Scratch resistance" is the ability of a material to resist more severe damage that can lead to visible, deeper or wider trenches. Thus, scratches are generally regarded as being more severe than what is referred to in the art as mar, and the two are regarded in the art as being different. As noted above, marring and scratching can result from manufacturing and environmental factors as well as through normal use. Although mar and scratch are in many respects differing degrees of the same thing, a coating that improves mar resistance may not be effective in improving scratch resistance, and vice versa. It will be appreciated, therefore, that the present additives can be used in conjunction with other additives that impart improved mar and/or scratch resistance to coatings.

DETAILED DESCRIPTION OF THE INVENTION

The present invention is generally directed to an additive comprising an aminoplast and silica nanoparticles, sometimes referred to herein as the "present additive". Particularly suitable aminoplasts are "modified aminoplasts" formed from the reaction between an aminoplast and one or more modifying components, as further described below. The additives are generally prepared by mixing together one or more aminoplasts with silica nanoparticles, which will be understood as being dispersed in organic solvent. The aminoplast is used in an amount sufficient to disperse the silica in the resulting mixture.

Any aminoplast known in the art can be used according to the present invention, in either an unmodified form or modified as discussed below. As will be known to those in the art, aminoplast resins are based on the condensation products of an amino- or amido-group containing compound with an aldehyde, such as formaldehyde, acetaldehyde, crotonaldehyde, acrolein, benzaldehyde, furfural and glyoxal; formaldehyde is most often used. The reaction product of an amino- or amido group-containing compound and an aldehyde is often reacted further with an alcohol to produce partially or fully alkylated derivatives. These derivatives are also "aminoplasts" within the present invention.

The term "aminoplast" also includes phenoplasts (phenolic resins), specifically, the resole-type resins that are the reaction product of phenol and an aldehyde, and that have the further property of containing pendant hydroxymethyl or alkoxymethyl groups. Resole resins and resolated novolac resins are examples of suitable phenoplasts.

Dimeric and oligomeric products resulting from self-condensation reactions that occur during aminoplast formation are also "aminoplasts" within the present invention.

The aminoplasts used in the present invention can be generally represented by the formula:

$$A\text{-}(R)_n$$

wherein the "A" group in A-(R)$_n$ is an n-functional polyamino anchor molecule connected to (R)$_n$ groups via the nitrogens. Suitable "A" groups include glycoluril ureas, melamine, guanamine, and the like. The "R" group in A-(R)$_n$ can be hydrogen, an alkyl group of 1 to 10 carbon atoms, a crosslinkable group such as —CH$_2$OH or —CH$_2$OR$^8$ wherein R$^8$ is an alkyl group of 1 to 10 carbon atoms, or an aminoplast group-containing oligomeric group provided that the total number of the crosslinkable groups per each aminoplast crosslinking agent is at least 2. The "n" in A-(R)$_n$ is the total functionality of the polyamino anchor molecule A, and is 2 or greater. Suitable aminoplasts are further described in U.S. Pat. No. 5,256,493, hereby incorporated by reference.

The aminoplasts used according to the present invention can be either liquid or solid at room temperature (i.e. 20° C.). Examples of suitable liquid aminoplasts include those in the CYMEL line, commercially available from Cytec Industries, Inc., and those in the RESIMENE line, commercially available from Solutia, Inc. Most of these products are alkyl ethers derived from hexamethylol melamine. An example of a suitable solid aminoplast is POWDERLINK 1174, a methyl ether derivative of tetramethylol glycoluril, also commercially available from Cytec Industries Inc.

In addition to using commercially available aminoplasts, modified versions of these aminoplasts can also be used. This is especially true for powder coating applications where solid aminoplast crosslinkers are not widely available. Certain aminoplasts are better suited for modification than others. A particularly suitable aminoplast, or "A" in the formula above, for use in forming a modified aminoplast is an aminotriazine compound having one or less nonalkylated NH bond per triazine ring; this can include aminoplast resins such as alkoxyalkyl aminotriazine compounds, for example, derivatives of melamine, benzoguanamine, acetoguanamine, formoguanamine, spiroguanamine and the like. Aminoplast resins for use as the aminotriazine compound include, for example, highly alkylated, low imino aminoplast resins. (Methoxymethyl)aminotriazine compounds are particularly suitable. Such compounds are commercially available from Solutia, Inc. as RESIMENE CE-7103, 745, and 747 and from Cytec Industries, Inc. as CYMEL 300, 303, 1116, 1123, 1133, 1135, 1156, and 1168.

In another embodiment wherein a modified aminoplast is formed, "A" is an alkoxylated aldehyde condensate of glycoluril. Such compounds can be prepared, for example, by reacting glycoluril, or acetylene diurea, with an aldehyde, such as formaldehyde, to form tetra-alkylol glycoluril. In one embodiment, the alkylol groups are etherified with a mono-alcohol, such as a C$_1$ to C$_6$ mono-alcohol, to form tetra-alkoxy alkyl glycoluril. An example of such a tetra-alkoxyalkyl glycoluril is tetra-methoxy methyl glycoluril, commercially available as POWDERLINK 1174 from Cytec Industries, Inc. Also suitable is cyclohexanol etherified tetra-methylol glycoluril.

In one embodiment of the present invention, the aminoplast resins comprise highly alkylated, low imino aminoplast resins that have a degree of polymerization ("DP") of less than 2.0, often less than 1.8, and typically less than 1.5. Generally, the number average degree of polymerization is defined as the average number of structural units per polymer chain. For purposes of the present invention, a DP of 1.0 would indicate a completely monomeric triazine structure, while a DP of 2.0 indicates two triazine rings joined by a methylene or methylene-oxy bridge. It should be understood that the DP values reported herein represent average DP values as determined by gel permeation chromatography data. It should be further understood that not every aminoplast can be modified by every one of the modifying components discussed herein. For example, if the modifying component is polyfunctional and reacts with the aminoplast more than once, low DP (i.e. <1.8) aminoplasts should be used. If the modifying component is monofunctional or behaves like a monofunctional compound (such as a monohydroxy phenol), there is no restriction on the DP value of the aminoplast.

Modification of the aminoplast is effected by reacting an aminoplast resin with a modifying component. If the starting aminoplast resin is liquid, the modifying component is one that, upon reaction with the aminoplast, will result in a solid or ungelled product; in this case, the modifying component can be more specifically described as a powder forming component. If the starting aminoplast resin is already solid, the modifying component is one that, upon reaction with the aminoplast, will result in a solid or ungelled product that either will not lower the glass transition temperature ("Tg") of a coating composition to which it is added or that will lower the amount of gassing during curing of a coating composition as compared to the unmodified aminoplast.

To determine whether a compound is a modifying component (also referred to herein as a modifying compound) within the present invention, a reaction with an aminoplast can be run as described below. If the result of the reaction is to convert a liquid aminoplast to a solid or ungelled reaction product, the compound is a modifying compound; if the result of the reaction is to improve the performance characteristics of a solid aminoplast as described above, the compound is also a modifying compound within the present invention. Some modifying components will have two or more reactive groups. Examples of suitable modifying components include monohydroxy phenol derivatives, polyhydric compounds, polyester polyols and urethanes, such as those described below. Other compounds suitable for use as modifying components are also discussed below. Combinations of modifying components can be used according to the present invention.

The phenol derivatives can be, for example, monohydroxy aromatic compounds having the following structure (I):

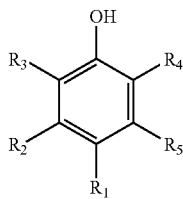

(I)

wherein $R_1$ through $R_5$ are the same or different and can be H; a monovalent hydrocarbon group; $COOR_6$; $NO_2$; halogen; or $XR_7$; where $R_6$ is H or a monovalent hydrocarbon group, X is O or S, and $R_7$ is a monovalent hydrocarbon group having 1 to 8 carbon atoms. At least one of $R_3$ and $R_4$ is H. When $R_4$ is H and $R_3$ is not, $R_1$ and $R_2$ taken together, $R_1$ and $R_5$ taken together, or $R_2$ and $R_3$ taken together can be fused aliphatic or aromatic ring structures; when $R_3$ is H and $R_4$ is not, $R_1$ and $R_2$ taken together, $R_1$ and $R_5$ taken together, or $R_5$ and $R_4$ taken together can be fused aliphatic or aromatic ring structures. Similarly, if $R_3$ and $R_4$ are both H, $R_1$ and $R_2$ taken together or $R_1$ and $R_5$ taken together can be fused aliphatic or aromatic ring structures. In a particularly suitable embodiment of the compound having Structure I, $R_3$ and $R_4$ are both H; in another particularly suitable embodiment, $R_1$ is selected from aryl, alkylaryl, alkoxy, COOH, $NO_2$ and halogen. In another particularly suitable embodiment, $R_1$ and either $R_3$ or $R_4$ are tertiary butyl groups.

By "monovalent hydrocarbon group" is meant an organic group containing carbon and hydrogen. The hydrocarbon groups may be aliphatic or aromatic, and may contain from 1 to 24 (in the case of aromatic from 3 to 24) carbon atoms. A "monovalent hydrocarbon group" can also be a heteroatomic hydrocarbon group, that is, one or more of the carbon molecules in the groups can be substituted with heteroatoms, typically oxygen or nitrogen. Nonlimiting examples of such monovalent hydrocarbon groups include alkyl, alkoxyl, aryl, alkylaryl or alkoxyaryl groups.

By "alkyl" is meant acyclic or cyclic groups having a carbon chain length of from $C_1$ to $C_{25}$. By "alkoxyl" is meant an alkyl group containing at least one oxygen atom, such as an ether oxygen, and having a carbon chain length of from $C_2$ to $C_{25}$, such as from $C_2$ to $C_8$; this includes compounds having one or more ester linkages. An "aryl" group is an aromatic group containing one or more aromatic rings, fused or unfused, containing 3 to 24 carbons. By "alkylaryl" is meant an acyclic alkyl group having a carbon chain length of from $C_2$ to $C_{25}$ and containing at least one aryl group, such as phenyl. Similarly, "alkoxyaryl" refers to an alkyl group containing at least one oxygen atom and having a carbon chain length of from $C_2$ to $C_{25}$, and at least one aryl group. The aryl group(s), either alone or in conjunction with an alkyl or alkoxy group, may optionally be substituted. Suitable substituents include heteroatoms (O, N and S), hydroxyl, benzyl, carboxylic acid, alkoxy and alkyl groups, for example.

Nonlimiting examples of monohydroxy aromatic compounds suitable for use as the modifying component in the present invention include p-cresol, 4-methoxyphenol, 4-tert-butylphenol, 2,4-di-tert-butylphenol, 4-nitrophenol, 4-fluorophenol, 2-phenylphenol, 4-phenylphenol, 1-napthol, and 2-naphthol. In one embodiment, the monohydroxy aromatic compound comprises 4-tert-butylphenol.

Suitable polyhydric compounds useful as modifying components can be any of a variety of compounds having two or more groups reactive towards the aminoplast. These polyhydric compounds can be aliphatic, cycloaliphatic or aromatic. For example, when the aminoplast is POWDERLINK 1174, the polyhydric compound can contain hydroxyl groups. In one embodiment, the polyhydric compound comprises a diol, a triol, or a mixture of the two. Examples of suitable diols include cycloaliphatic diols, such as hydrogenated Bisphenol A, cyclohexane dimethanol, cyclohexane diol and mixtures thereof. Cyclohexane dimethanol and hydrogenated Bisphenol A are particularly suitable. Examples of suitable triols include trimethylol propane, tris(hydroxyethyl)isocyanurate, and mixtures thereof.

The polyhydric aromatic compounds can be any of a variety of polyhydric aromatic compounds known in the art, such as dihydric aromatic compounds. Suitable polyhydric aromatic compounds are generally represented by the following structures (II) or (III):

or

where $\Phi^1$, $\Phi^2$ and $\Phi^3$ are the same or different and each independently represents a divalent aromatic group; Y represents a polyvalent linking group.

By "divalent aromatic group" is meant any divalent group derived from a substituted or unsubstituted aromatic compound. Examples of suitable substituent groups include alkyl, alkoxy, aryl, alkylaryl groups, heteroatoms such as nitrogen or oxygen, and halogen atoms, for example chlorine and bromine, provided that at least one of the positions ortho to each OH group is hydrogen substituted.

The polyvalent linking group Y can be any polyvalent atom or radical, for example oxygen, sulfur, —SO—, —$SO_2$—, divalent hydrocarbon radicals containing up to 10 carbon atoms, and sulfur-, silicon- or nitrogen-containing hydrocarbon radicals. In one embodiment, Y is a divalent $C_3$ hydrocarbon radical.

In certain embodiments of the invention, the polyhydric aromatic compound is selected from 4,4'-isopropylidenediphenol(Bisphenol A), bis(4-hydroxyphenyl)methane, 2,2'-biphenol, dihydroxynaphthalene, resorcinol, hydroquinone, catechol and mixtures thereof. Bisphenol A is particularly suitable.

The polyester polyols used as the modifying component in the present invention can comprise the polyester polyol condensation reaction product of (a) a cycloaliphatic polyol and (b) a cyclic polycarboxylic acid or anhydride.

The cycloaliphatic polyol can be any of a variety of polyhydric cycloaliphatic compounds known in the art. Suitable examples include hydrogenated Bisphenol A, hydrogenated Bisphenol F, hydrogenated Bisphenol E, M, P, Z, and the like, cyclohexyl dimethanol, cyclohexane diol and mixtures thereof. Hydrogenated Bisphenol A is especially suitable.

The cyclic polycarboxylic acid or anhydride can be any cyclic compound having two or more carboxylic acid groups per molecule. For example, the cyclic polycarboxylic acid/anhydride can be hexahydrophthalic acid, phthalic acid, isophthalic acid, terephthalic acid, anhydrides thereof, and mixtures thereof. Hexahydrophthalic anhydride is especially suitable.

The polyester polyol can be prepared by general condensation reaction techniques well known in the art, so long as the ratio of reactants (a) and (b) and reaction conditions are such that the resulting condensation reaction product comprises two or more reactive hydroxyl groups per molecule. For purposes of the present invention, the molar ratio of the cycloaliphatic polyol (a) to the cyclic polycarboxylic acid or anhydride (b) typically ranges from 1.0 to 2.5:1, such as from 1.5 to 2.2:1 or from 1.8 to 2.2:1.

The polyester polyol can be prepared generally as follows. The acid/anhydride and alcohol(s) are reacted using condensation techniques well known to the art. The reaction is monitored by periodic sampling for acid value and hydroxyl number measurements. The reaction is terminated when these measurements meet the desired values. Typically, the acid value of the polyester polyol is between 0.1 and 20, such as between 0.5 and 5, and the hydroxyl value is greater than 130 and ranges from 130 to 190, such as from 140 to 175.

The polyester polyol typically has a number average molecular weight ("Mn") ranging from 400 to 2000, such as from 400 to 1500, or from 400 to 1000. Further, the polyester polyol typically has a Tg of at least 30° C., such as at least 35° C., or at least 40° C., and a glass transition temperature less than 120° C., such as less than 110° C., or less than 100° C. The Tg of the polyester polyol can range between any combination of these values inclusive of the recited values. The Tg of the polyol can be measured experimentally using methods known in the art, such as differential scanning calorimetry (rate of heating 10° C. per minute, Tg taken at the first inflection point). Unless otherwise indicated, the stated Tg as used herein refers to the measured Tg.

When a polyhydric compound or a polyester polyol is used as the modifying compound, the aminoplast that is modified should be one having a low DP, such as <1.8 or <1.5.

Two different types of reactive urethane group-containing compounds ("urethane compounds") can also be used as the modifying component of the present invention. The first of these urethane compounds comprises the reaction product of (a) a polyester polyol, and (b) a monoisocyanate. The polyester polyol (a) can be any of a variety of polyesters having two or more reactive hydroxyl groups, such as the polyester polyols described above, which comprise the condensation reaction product of (a) a cycloaliphatic polyol and (b) a cyclic polycarboxylic acid or anhydride.

When used to form the first urethane compound, the polyester polyol typically has an Mn ranging from 300 to 3000, such as from 350 to 2500, or from 400 to 2200; also the hydroxyl value of the polyester polyol used here is typically greater than 90, such as from 100 to 180, or from 110 to 170. The Tg values for the polyester polyol used to make the first urethane are as described above.

The monoisocyanate used in the formation of the first urethane compound can be any of a variety of isocyanate compounds that are monofunctional with regard to the NCO group. Nonlimiting examples of monoisocyanates include cyclohexyl isocyanate, phenyl isocyanate, butyl isocyanate and mixtures thereof, with cyclohexyl and phenyl isocyanates being particularly suitable. The first compound can be prepared by general NCO/OH reaction techniques well known in the art, so long as the ratio of the polyol and monoisocyanate and the reaction conditions are such that the resulting reaction product comprises at least one, such as two, reactive urethane NH groups per molecule. The molar ratio of the polyester polyol to the monoisocyanate typically ranges from 1:1.7 to 2.0, such as from 1:1.75 to 2.0, or from 1:1.8 to 2.0.

The first urethane compound can be prepared as follows. Typically, the polyester polyol is dissolved in an appropriate aromatic solvent, for example xylene or toluene, with a tin catalyst, for example dibutyl tin dilaurate or dibutyl tin diacetate. The mixture is then preheated to approximately 55° C. and the monoisocyanate is added dropwise. The addition rate is typically adjusted so that the reaction temperature is less than 90° C. The reaction is complete when all the isocyanate functionality is consumed.

The second urethane compound suitable for use as the modifying component comprises the reaction product of (a) a polyisocyanate and (b) a monohydric capping agent. Nonlimiting examples of polyisocyanates include aliphatic polyisocyanates, such as aliphatic diisocyanates, for example, 1,4-tetramethylene diisocyanate and 1,6-hexamethylene diisocyanate; cycloaliphatic polyisocyanates, for example, 1,4-cyclohexyl diisocyanate, isophorone diisocyanate, and α,α-xylylene diisocyanate; and aromatic polyisocyanates, for example, 4,4'-diphenylmethane diisocyanate, 1,3-phenylene diisocyanate, and toluene diisocyanate. These and other suitable polyisocyanates are described in more detail in U.S. Pat. No. 4,046,729, at column 5, line 26 to column 6, line 28, incorporated herein by reference. Higher polyisocyanates, for example isophorone diisocyanate trimer and hexamethylene diisocyanate trimer are also useful and, typically, are more suitable. Mixtures of polyisocyanates can also be used.

The monohydric capping agent can comprise any of a wide variety of monohydroxyl functional materials. Typically, the monohydric capping agent comprises one or more lower aliphatic alcohols, for example cyclic and acyclic alcohols having 1 to 6 carbon atoms in the alkyl group and/or aromatic alcohols. Nonlimiting examples include methanol, ethanol, propanol, butanol, hexanol, cyclohexanol and phenol. In one embodiment, the monohydric capping agent is methanol, cyclohexanol, phenol or mixtures thereof; cyclohexanol is especially suitable.

The second urethane compound can be prepared in much the same way as the first, but with the polyisocyanate being dissolved in the aromatic solvent and the monohydric capping agent being added dropwise. Also the ratio of NCO equivalents of the polyisocyanate to OH equivalents of the monohydric capping agent typically ranges from 0.70 to 1.0:1, such as from 0.75 to 1.0:1, or from 0.8 to 1.0:1.

Still more modifying components within the present invention include those having the following structure (IV):

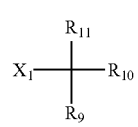

(IV)

wherein $X_1$ is aromatic or cycloaliphatic; $R_9$, $R_{10}$, and $R_{11}$ can be the same or different and each independently represents H, (cyclo)alkyl groups having from 1 to 12 carbon atoms, aryl, alkylaryl, or an active hydrogen-containing group that is reactive with the aminoplast, provided that at least one of $R_9$, $R_{10}$, and $R_{11}$ is such an active hydrogen-containing group. Alkyl, aryl and alkylaryl are all described above. Especially suitable X groups include cyclohexyl, phenyl, naphthyl, anthracyl, pyrene, benzofuranyl, and the like. "Active hydrogen containing group" refers generally to a group that has one or more active hydrogens, such as those provided by hydroxyl, amide, amine, carboxylic acid, carbamate, urea, and thiol groups.

In one embodiment, the modifying component comprises at least one compound having structure (IV) wherein at least one of $R^9$, $R^{10}$, and $R^{11}$ represents a group comprising at least one hydroxyl group. Examples of active hydrogen-containing compounds within structure (IV) include benzyl alcohol and substituted benzyl alcohols, such as 3-phenoxybenzyl alcohol and 4-methoxybenzyl alcohol; phenethyl alcohol; benzopinacol; N-benzylformamide; benzyl lactate; benzyl mandelate; benzyl mercaptan; N-benzylmethamine; 3-furanmethanol; furfuryl alcohol; pyridylcarbinols, such as 2-pyridylcarbinol, and 3-pyridylcarbinol; 1-pyrenemethanol; 9-anthrancenemethanol; 9-fluorenemethanol; 9-hydroxyfluorene; 9-hydroxyxanthene; 9-phenylxanthen-9-ol; 4-stilbenemethanol; and triphenylmethanol.

Another modifying component useful in the present invention comprises compounds having the following structure (V):

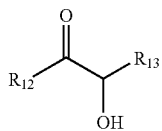

(V)

or dimer derivatives thereof as discussed below, where $R_{12}$ and $R_{13}$ are the same or different and each independently represents an aryl group having 4 to 20 carbons or an alkyl group having 1 to 12 carbon atoms. In one embodiment of the present invention, one or both of $R_{12}$ and $R_{13}$ are aryl groups, for example, phenyl, naphthyl, methoxy phenyl, and dimethylaminophenyl groups. The aryl groups can also contain one or more heteroatoms, such as O, N, and S, either internal or external to an aromatic ring of the aryl group. The heteroatoms external to the ring may be attached directly to the ring or indirectly through one or more carbon atoms. One or more heteroatoms may be present in each such substituent and one or more substituents may be attached to an aromatic ring of the aryl group. The heteroatom-containing substituent group(s) may be attached to an aromatic ring of the aryl group in any position or combination of positions on the ring. Suitable heteroatomic substituent groups include but are not limited to amines, ethers, esters, ketones, amides, halides, sulfonamides, nitro and carboxylic acid groups. Heteroatoms internal to the aromatic ring of this structure may be present in any position or combination of positions. Examples can include but are not limited to furans, pyridines, thiophenes, triazines, imidazoles, oxazoles, thiazoles, pyrazoles and triazoles. Nonlimiting examples of such compounds having Structure V include anisoin, pyridoin, furoin, and bufyroin.

Compounds having the general structure (V) above are known to form dimeric derivatives, particularly when $R_{12}$ and $R_{13}$ are alkyl:

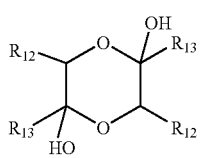

(VI)

Such dimer derivatives can have the structure (VI) above where $R_{12}$ and $R_{13}$ are as described above for the structure (V).

Yet another modifying component useful in the present invention is a compound that is different from any of the others described above, and is characterized as containing at least one reactive hydrogen and as having a melting point of at least 60° C. The melting point of a compound can be determined by using a standard capillary melting point apparatus or by thermal analysis (ASTM E974-95). Generally, the melting point of this powder forming compound will be less than 250° C., usually less than 220° C., and typically less than 200° C., and will generally be at least 60° C., usually at least 80° C., and typically at least 90° C. or 100° C. The melting point can range between any combination of these values inclusive of the recited values. Nonlimiting examples of such compounds suitable for use as modifying components include mono-alcohols such as borneol, norborneol, isoborneol, 1-adamantanemethanol, 1-adamantanol, 2-methyl-2-adamantanol and 5-norbornen-2-ol; secondary amides, such as aliphatic cyclic amides such as 1-methylhydantoin, 2,4-thiazolidinedione, 2-azacyclotridecanone, 3,4,5,6,7,8-hexahydro-2(1H)-quinoline, 4-azatricyclo(4.3.1.1(3,8))undecan-5-one and 4-methoxy-3-pyrrolin-2-one; aliphatic open chain amides, such as N-(1-adamantyl)acetamide) and N-tert-butylacrylamide; aromatic (poly)cyclic amides, including lactams, such as 1-acetamidopyrene, 2-acetamido-3-nitro-9-fluorenone, 2-acetoamide-7-fluorfluorene, 2-acetamidofluorene, 4-acetamido-9-fluorenone, naphthol AS acetate, 1-phenyl-3-pyrazolidinone, 2,3-dimethyl-1-(4-methylphenyl)-3-pyrazolin-5-one, 3,4-dimethyl-1-phenyl-3-pyrazolin-5-one, 3-(4-ethoxyphenyl)-1-(2-nitrophenyl)-hydantoin, 4-acetamidoantipyrine, and 4-acetamidobenzaldehyde; aromatic open chain amides, such as 3-acetamidocoumarin and p-acetophenetidide; and mono-urethanes such as those obtained by reacting high melting point mono-alcohols (such as those described immediately above) with suitable mono-isocyanates.

In a specific embodiment, the compound having a melting point ≧60° C. is a monofunctional sulfonamide with only one active hydrogen. It will be appreciated that such sulfonamides generally have the structure (VII):

$R_{14}SO_2NH\ R_{15}$     (VII)

wherein $R_{14}$ can be virtually any unreactive organic moiety. Examples include H, (cyclo)alkyl having from 1 to 12 carbon atoms, aryl, alkaryl, aralkyl, alkoxy, or aryloxy, all of which can be substituted or unsubstituted and $R_{15}$ is a (cyclo)alkyl group having from 1 to 12 carbon atoms, aryl, alkaryl, aralkyl, alkoxy carbonyl, alkyl carbonyl, or an aryl carbonyl. Substituents $R_{14}$ and $R_{15}$ can also be intramolecularly connected. Specific examples of compounds within structure (VII) include N-alkyl-p-toluene sulfonamide, and saccharine.

Additional modifying compounds according to the present invention are carboxylic acid-containing compounds. A "carboxylic acid-containing compound" refers to any compound that has at least one carboxylic acid functional group. A number of carboxylic acids can be used according to the present invention, provided they are of the appropriate acidity. Generally, carboxylic acids having a pKa of >3, such as >4, are suitable. "pKa" values reported herein refer to pKa as measured in deionized water at 25° C. "pKa" will be understood as a means for expressing the strength of acids; the weaker the acid, the larger the pKa. If the pKa is below about 3, the acid will catalyze the self-condensation of the aminoplast resin; this will result in a gelled rather than an ungelled reaction product. Similarly, the use of a polycarboxylic acid alone can result in a gelled product. Thus, the carboxylic acid-containing compound is most suitably a monofunctional acid, or a mixture of monofunctional and polyfunctional acids. If such a mixture is used, the polyfunctional acid should typically comprise $\leq 20$ percent of the mixture. Aromatic carboxylic acids, such as benzoic acid and its derivatives are particularly suitable; derivatives of benzoic acid include those materials having substituents on the phenyl ring of the benzoic acid molecule; examples include toluic acids, anisic acid, and 4-tert-butyl benzoic acid. Aromatic group-containing alkyl carboxylic acids such as cinnamic acid and phenyl acetic acid and its derivatives are also suitable; derivatives of phenyl acetic acid include those compounds wherein the phenyl ring of the acid is substituted. Other suitable monofunctional carboxylic acids include, but are not limited to, hexahydrobenzoic acid, diphenyl acetic acid and those known to one skilled in the art. Polycarboxylic acids suitable for use with one or more monofunctional carboxylic acids include phthalic acid, terephthalic acid, and trimellitic acid.

Particularly suitable modified aminoplasts are those prepared from the reaction between aminotriazine compounds having one or less nonalkylated NH bond per triazine ring and a monohydroxy aromatic compound, for example a monohydroxy phenol derivative.

The modified aminoplasts of the present invention can be prepared by combining the aminoplast and modifying compound in a suitably equipped reaction vessel, typically with a suitable solvent and an appropriate strong acid as catalyst. Any suitable solvent can be used; aromatic solvents are particularly suitable, including but not limited to xylene, toluene, and mixtures thereof. Nonlimiting examples of strong acids suitable for use as catalysts include, but are not limited to, p-toluene sulfonic acid and dodecyl benzene sulfonic acid. Normal condensation techniques well known in the art can be used to combine the reactants. Generally, the reaction admixture is heated to a temperature ranging from 90° C. to 135° C., such as from 100° C. to 125° C., and held at that temperature for a period sufficient to obtain an ungelled product.

In the preparation of the modified aminoplasts, the reactants are combined in a molar ratio such that the aminoplast compound is in excess. The reaction between aminoplast and modifying component is terminated when the end point is detected by infrared spectroscopy. The appropriate end point will differ depending on the modifying component. For urethanes, for example, the reaction is monitored by infrared spectroscopy for the disappearance of urethane NH functionality relative to an internal standard (such as the urethane carbonyl signal, which will remain unchanged during the reaction). For other modifying components, the end point can be determined based on the disappearance of the OH signal. For example, the molar ratio of the aminoplast to most of the modifying components described above can range from 0.5 to 5.0:1, such as from 1.8 to 4.0:1, or from 1.9 to 3.6:1. For the carboxylic acid embodiment, there is an excess of carboxylic acid as compared to aminoplast. For example, the molar ratio of carboxylic acid-containing component to aminoplast can be greater than 1.5:1. With regard to the aminoplast compound, the theoretical molecular weight of the monomeric aminoplast compound (that is, where the DP equals 1) is used to calculate the "molar ratio". Using the appropriate ratio, and carrying the reaction to completion, ensures a stable-modified aminoplast that is essentially free of active hydrogen-containing functionality. The reaction is monitored for the disappearance of active hydrogen-containing functionality relative to an internal standard via infrared spectroscopy (i.e., a hydroxyl signal is compared to the signal of a structure that will remain essentially unchanged as the reaction proceeds to completion, for example, the C—H stretch signal).

The modified aminoplasts typically have a Tg of at least −10° C., such as at least 15° C., or at least 20° C., or 25° C. Also, the Tg is typically less than 150° C., such as less than 100° C., or less than 80° C. The Tg of the modified aminoplast can range between any combination of these values, inclusive of the recited values. If the Tg is lower than about 20° C., it may not be in a form easily added to a powder coating; in such instances, the product can be frozen to facilitate its addition to the coating formulation.

The aminoplasts used in the present additive can optionally be mixed or reacted with one or more functional siloxanes. Formulations including such siloxane have been surprisingly discovered to impart even greater silica dispersing ability to the aminoplast. A "functional siloxane" within the invention includes any alkyl-substituted polysiloxane having as a substituent at least one active hydrogen-containing group, which is also reactive with the aminoplast. The siloxanes used in the present invention can generally be represented by the structure (VIII):

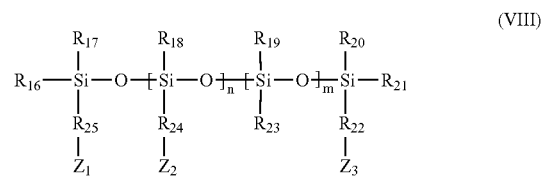

wherein $R_{16}$, $R_{17}$, $R_{18}$, $R_{19}$, $R_{20}$, $R_{21}$, and $R_{23}$ can be the same or different and can be a monovalent hydrocarbon group of 1 to 10 carbon atoms; $R_{22}$, $R_{24}$, and $R_{25}$ can be the same or different and can be a divalent hydrocarbon group of 1 to 24 carbon atoms; and $Z_1$, $Z_2$, and $Z_3$ can be the same or different and can be H, OH, COOH, $NH_2$, $NHR_{26}$, $CONH_2$, $CONHR_{26}$, or $NHCOOR_{26}$ or any active hydrogen group reactive with aminoplasts where $R_{26}$ is a monovalent hydrocarbon group. The "n" and the "m" in the structure each indicate the number of their respective repeating units in the siloxane, and can be 0 to 12.

By "divalent hydrocarbon group" is meant an organic group containing carbon and hydrogen. The hydrocarbon groups may be aliphatic or aromatic, and may contain from 1 to 24 (in the case of aromatic from 3 to 24) carbon atoms. A "divalent hydrocarbon group" can also be a heteroatomic hydrocarbon group, that is, one or more of the carbon molecules in the groups can be substituted with heteroatoms, typically oxygen or nitrogen. Nonlimiting examples of such divalent hydrocarbon groups include alkyl, alkoxyl, aryl, alkylaryl, alkoxyalkyl or alkoxyaryl groups, which are all as defined above.

In one embodiment of the present invention, n is 1 and m is 0 to 3, one or all of $R_{16-21}$ are methyl, $R_{26}$ is an aliphatic ether or polyether, $Z_2$ is an alcohol, $R_{22}$ and $R_{25}$ are methylenes, and $Z_1$ and $Z_3$ are hydrogen.

Functional siloxanes include, for example, 1,1,1,3,3,5,5 heptamethyl-5-(hydroxyethoxypropyl)trisiloxane, 1,1,3,3-tetramethyl-1,3-di(hydroxyethoxypropyl)trisiloxane, and [3-[1,3,3,3-tetramethyl-1-[(trimethylsilyl)oxy]disiloxanyl] propoxy]-propanol. MASIL SF-19, commercially available from BASF, is a particular example.

In the embodiments in which siloxane is also used, it can be mixed with or reacted with the aminoplast. If the aminoplast is an unmodified liquid aminoplast, the siloxane can be added directly to the aminoplast, and if the aminoplast is an unmodified solid aminoplast, the aminoplast can be dissolved or dispersed in organic solvent and the siloxane subsequently added. When a modified aminoplast is used, the siloxane can be reacted with the modified aminoplast under the same conditions as described for the reaction between the aminoplast and modifying component. Alternatively, the siloxane can be reacted with the aminoplast at the same time as the modifying component; siloxane can simply be added to the reaction vessel with the other components. In either case, the result will be an aminoplast that has reacted with both a modifying component and a siloxane.

When functional siloxane is used, the molar ratio of functional siloxane to aminoplast ranges between 0.5 and 3:1.0, such as between 0.5:1.0.

The present additives are formed by mixing the aminoplasts described above with colloidal silica. Because colloidal silica is in liquid form, the aminoplast, during formation of the present additives, should also be in liquid form. If using a liquid aminoplast, no additional steps need be taken. Similarly, preparation of the modified aminoplasts takes place in a solvent, and such a solution/disposition can be admixed directly with the silica nanoparticles. If a solid aminoplast that is not already contained in a solvent is used, it should first be dissolved or dispersed in one or more organic solvents. Suitable organic solvents include, for example, methyl isobutyl ketone, methyl ethyl ketone, methanol, and isopropanol. Mixture of the colloidal silica with the aminoplast can be effected by simply adding the solvent dispersed nano-silica to a solution of the aminoplast. The resulting product can then be stripped of solvent, such as through application of vacuum or other standard methods, to yield a powder additive in which silica nanoparticles are dispersed throughout the aminoplast. The powder additive can then be added to a powder or liquid coating. Alternatively, the additive can be kept in liquid form and added to a liquid coating to achieve enhanced mar and/or scratch resistance.

Suitable colloidal silica is commercially available from Nissan as MT-ST, MEK-ST, and MIBK-ST and from Clariant as HIGHLINK OG. The MEK-ST and MIBK-ST products are 30 percent silica dispersions, in which the surface of the silica particles has been modified to render the particles stable in a non-hydroxy solvent; these surface modified silica products are particularly suitable in the present methods.

The silica particles are typically below one micron in average particle size, such as below 800 nanometers ("nm"). Such particles often have an average particle size in the 12 to 15 nm range. The aminoplast should be used in an amount sufficient to disperse the silica in the resulting aminoplast/silica mixture. The silica remains substantially evenly dispersed throughout the mixture both when the mixture is kept in liquid form or put in solid form. Typically, the silica comprises between 10 and 40 weight percent of the additive. The weight ratio of silica to aminoplast is generally between 0.3 and 2:3, such as 1:3.

The additives of the present invention can be incorporated into coating compositions. Any resin that forms a film can be used in the present coatings, absent compatibility problems. For example, resins suitable for either powder or liquid coating compositions can be used.

A particularly suitable resin is one formed from the reaction of a polymer having at least one type of reactive functional group and a curing agent having functional groups reactive with the functional group of the polymer. The polymers can be, for example, acrylic, polyester, polyether or polyurethane, and can contain functional groups such as hydroxyl, carboxylic acid, carbamate, isocyanate, epoxy, amide and carboxylate functional groups.

The use in powder coatings of acrylic, polyester, polyether and polyurethane polymers having hydroxyl functionality is known in the art. Monomers for the synthesis of such polymers are typically chosen so that the resulting polymers have a Tg greater than 50° C. Examples of such polymers are described in U.S. Pat. No. 5,646,228 at column 5, line 1 to column 8, line 7, incorporated herein by reference.

Acrylic polymers and polyester polymers having carboxylic acid functionality are also suitable for powder coatings. Monomers for the synthesis of acrylic polymers having carboxylic acid functionality are typically chosen such that the resulting acrylic polymer has a Tg greater than 40° C., and for the synthesis of the polyester polymers having carboxylic acid functionality such that the resulting polyester polymer has a Tg greater than 50° C. Examples of carboxylic acid group-containing acrylic polymers are described in U.S. Pat. No. 5,214,101 at column 2, line 59 to column 3, line 23, incorporated herein by reference. Examples of carboxylic acid group-containing polyester polymers are described in U.S. Pat. No. 4,801,680 at column 5, lines 38 to 65, incorporated herein by reference.

The carboxylic acid group-containing acrylic polymers can further contain a second carboxylic acid group-containing material selected from the class of $C_4$ to $C_{20}$ aliphatic dicarboxylic acids, polymeric polyanhydrides, low molecular weight polyesters having an acid equivalent weight from about 150 to about 750, and mixtures thereof. This material is crystalline and can be a low molecular weight crystalline carboxylic acid group-containing polyester.

Also useful in the present powder coating compositions are acrylic, polyester and polyurethane polymers containing carbamate functional groups. Examples are described in WO Publication No. 94/10213, incorporated herein by reference. Monomers for the synthesis of such polymers are typically chosen so that the resulting polymer has a Tg greater than about 40° C.

Suitable curing agents generally include blocked isocyanates, polyepoxides, polyacids, polyols, anhydrides, polyamines, aminoplasts and phenoplasts. The appropriate curing agent can be selected by one skilled in the art depending on the polymer used. For example, blocked isocyanates are suitable curing agents for hydroxy and primary and/or secondary amino group-containing materials. Examples of blocked isocyanates are those described in U.S. Pat. No. 4,988,793, column 3, lines 1 to 36, incorporated herein by reference. Polyepoxides suitable for use as curing agents for COOH functional group-containing materials are described in U.S. Pat. No. 4,681,811 at column 5, lines 33 to 58, incorporated herein by reference. Polyacids as curing agents for epoxy functional group-containing materials are described in U.S. Pat. No. 4,681,811 at column 6, line 45 to column 9, line 54, incorporated herein by reference. Polyols, materials having an average of two or more hydroxyl groups per molecule, can be used as curing agents for NCO functional group-containing materials and anhydrides, and are well known in the art. Polyols for use in the present invention are typically selected such that the resultant material has a Tg greater than about 50° C.

Anhydrides as curing agents for epoxy functional group-containing materials include, for example, trimellitic anhydride, benzophenone tetracarboxylic dianhydride, pyromellitic dianhydride, tetrahydrophthalic anhydride, and the like as described in U.S. Pat. No. 5,472,649 at column 4, lines 49-52, incorporated herein by reference. Aminoplasts as curing agents for hydroxy, COOH and carbamate functional group-containing materials are well known in the art. Examples of such curing agents include aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

Hybrid resin systems, in which coreactive resins are used without a curing agent, can also be used. An example is an epoxy/polyether hybrid system.

The film-forming resin described above is generally present in the powder coating compositions in an amount greater than about 50 weight percent, such as greater than about 60 weight percent, and less than 90 weight percent, with weight percent being based on the total weight of the composition. For example, the weight percent of resin can be between 60 and 70 weight percent. When a curing agent is used, it is generally present in an amount of between about 10 and 40 weight percent; this weight percent is also based on the total weight of the coating composition.

The present additives can also be incorporated into film-forming resins that are liquid, that is, water-borne or solvent-borne systems. Such solvents include, for example, alcohols, ketones, aromatic hydrocarbons, glycol ethers, esters or mixtures thereof. Examples of polymers useful in forming the resin in the liquid coatings of the present invention include hydroxyl or carboxylic acid-containing acrylic copolymers, hydroxyl or carboxylic acid-containing polyester polymers, oligomers and isocyanate or hydroxyl-containing polyurethane polymers, and amine or isocyanate-containing polyureas. These polymers are further described in U.S. Pat. No. 5,939,491, column 7, line 7 to column 8, line 2; this patent, as well as the patents referenced therein, are incorporated by reference herein. Curing agents for these resins are also described in the '491 patent at column 6, line 6 to line 62. In solvent-based compositions, the solvent is generally present in amounts ranging from 5 to 80 weight percent based on total weight of the composition, such as 30 to 50 percent. Even higher weight percents of solvent can be present in water-based compositions and those that comprise water/cosolvent mixtures.

It will be appreciated that the present compositions are distinct from compositions known in the art that comprise a resin, an aminoplast curing agent (modified or unmodified) and silica in any form; in formation of such prior art compositions, there is no teaching that the aminoplast and silica be mixed together before addition of or to the resin. As such, the aminoplast in these prior art compositions is not used in an amount sufficient to disperse the silica. That is, the concentration of aminoplast in these mixtures, as well as the interaction of the aminoplast with other film-forming components, does not allow for suitable silica dispersion. In contrast, the present additives are formed so as to predisperse the silica in an aminoplast before combination with a film-forming resin. In addition to providing dispersed silica to the composition, the present additives may also react with the other formulation components, thereby influencing the film's surface properties. A curing agent, if the resin is one requiring a curing agent, should still typically be used in addition to the present additives. The inventors do not wish to be bound by this or any other particular mechanism, however.

The additives of the invention are typically present in the coating compositions in an amount ranging from 0.1 to 20.0 weight percent, such as from 3.0 to 12 weight percent, or from 4.5 to 11 weight percent, with weight percent based on total weight of the coating composition. While amounts of 20 weight percent or less are typically suitable, amounts even greater than 20 weight percent can also be used. Typically, the weight percent of silica nanoparticles in the coating composition ranges between about 1 and 5, such as between about 1 and 4, or between about 2 and 4, with weight percent based upon the total weight of the composition. It will be appreciated that improvement in mar and scratch resistance will increase as the concentration of the present additive increases. The tests described in the Example section below can be used by those skilled in the art to determine what weight percent or "load" of the present additive will give the desired level of protection. Upon curing of the coating, some of the silica nanoparticles may migrate to the surface region (i.e. the top quarter of the coating layer). In one embodiment, the silica nanoparticles can be fairly evenly dispersed in the cured coating; in another embodiment there is an increased concentration of silica nanoparticles in the surface region of the cured coating as compared with the bulk region (i.e. the bottom three-quarters of the coating).

The load of present additive in the coating compositions can affect not only the level of mar and/or scratch resistance but also the appearance of the cured coating. Thus, load should be optimized by the user based on the particular application, taking into account, for example, the level of acceptable haze, the level of desired mar and/or scratch resistance, the thickness of the coating and the like. Where appearance is particularly relevant, such as in an automotive clear coat, a relatively low load can be used. For industrial one-coat systems where haze is not as relevant, or where other pigments are present, loadings of up to about 20 percent or even higher can be used. One skilled in the art can optimize load to achieve the desired level of mar and/or scratch resistance without compromising the appearance or other mechanical properties of the cured coatings.

The powder coating compositions of the present invention may optionally contain additional additives such as waxes for flow and wetting, flow control agents, such as poly(2-ethylhexyl)acrylate, degassing additives such as benzoin and MicroWax C, adjuvant resin to modify and optimize coating properties, antioxidants, ultraviolet (UV) light absorbers and catalysts. Examples of useful antioxidants and UV light absorbers include those available commercially from Ciba-Geigy under the trademarks IRGANOX and TINUVIN. These optional additives, when used, are typically present in amounts up to 20 percent by weight, based on total weight of the coating.

The liquid coating compositions of the present invention can similarly contain optimal additives such as plasticizers, antioxidants, light stabilizers, UV absorbers, thixotropic agents, anti-gassing agents, organic cosolvents, biocides, surfactants, flow control additives and catalysts. Any such additives known in the art can be used, absent compatibility problems.

Micron sized particles can also be added. The average particle size of these materials can range from 0.1 to 10 microns, such as from 0.1 to 7 microns, or from 0.6 to 4.6 microns. Examples include diamond particles, such as diamond dust particles, and particles formed from carbide materials; examples of carbide particles include but are not limited to titanium carbide, silicon carbide and boron carbide. Other particles include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Mixtures of any of the above particles can be used, including different combinations of organic particles, inorganic particles, or both. The silica can be in any suitable form, such as crystalline, amorphous, or precipitated. The alumina can be used in any of its forms, such as alpha, beta, gamma, delta, theta, tabular alumina, and the like and can be fused or calcined, and if calcined, ground or unground.

The particles listed above are widely commercially available. For example, crystalline silica is available from Reade Advanced Materials; amorphous and precipitated silica from PPG Industries, Inc.; ZEEOSPHERES, silica alumina ceramic alloy particles, from 3M Corporation; silica alumina, such as G200, G-400, G-600, from 3M Corporation; alkali alumina silicate, such as W-210, W-410, and W-610, from 3M Corporation; borosilicate glass, sold as SUN-SPHERES, from MoSci Corporation; and quartz and nepheline syenite from Unimin, Inc. Other alumina products are available from Micro Abrasives Corporation as WCA3, WCA3S, and WCA3TO, and from Alcoa as T64-20. Zircon, buddeluyite and eudialyte are commercially available from Aran Isles Corporation, and boron nitride is available from Carborundum Inc. as SHP-605 and HPP-325. It will be appreciated that many commercially available products are actually composites or alloys of one or more materials; such particles are equally within the scope of the present invention.

Microparticles can be added in weight percentages of from 0.1 to 20, such as 0.5 to 15, 0.1 to 10, or 0.1 to 0.5, based on the total weight of the composition. Use of micron sized particles contributes to the mar and/or scratch resistance of the coating, but can also affect appearance in the same manner as described above for the silica nanoparticles used in the present additives. Thus, the determination as to the appropriate amount of microparticles will be made by the user based on such things as the application, the weight percent of silica nanoparticles incorporated through the present additives, and the like.

The additives of the present invention can be added at any time during the formulation of the coating. For example, curable powder coating compositions of the present invention can be prepared by first dry blending the film-forming resin, the present additive, and any of the additional additives described above in a blender, such as a Henschel blade blender. The blender is operated for a period of time sufficient to result in a homogenous dry blend of the materials. The blend is then melt blended in an extruder, such as a twin screw co-rotating extruder, operated within a temperature range sufficient to melt but not gel the components. The melt blended curable powder coating composition is typically milled to an average particle size of from, for example, 15 to 80 microns. Other methods known in the art can also be used.

Alternatively, the present powder compositions can be prepared by blending and extruding the ingredients as described above, but without the present additives. The present additives can then be added as a post-additive to the formulation, such as through a second extrusion process, or by simply mixing the particles into the blended composition, such as by shaking them together in a closed container or using a Henschel mixer.

For liquid coatings, the present additives can be added whenever an aminoplast would normally be added to a composition. For example, the present additives can be added to the coating composition under agitation after the film-forming resin is added. The present additives can also be added under agitation after the solvents.

The coating compositions of the invention can be applied to a variety of substrates, for example automotive substrates such as fenders, hoods, doors and bumpers, and industrial substrates such as household appliances, including washer and dryer panels and lids and refrigerator doors and side panels, lighting fixtures, metal office furniture. Such automotive and industrial substrates can be metallic, for example, aluminum and steel substrates, and non-metallic, for example, thermoplastic or thermoset (i.e. "polymeric") substrates. Other objects made from wood and medium density fiberboard can also be coated with the present compositions.

The powder coating compositions are most often applied by spraying, and in the case of a metal substrate, by electrostatic spraying, or by the use of a fluidized bed. The powder coating can be applied in a single sweep or in several passes to provide a film having a thickness after cure of from about 1 to 10 mils (25 to 250 micrometers), usually about 2 to 4 mils (50 to 100 micrometers). Other standard methods for coating application can be employed such as brushing, dipping or flowing.

The liquid compositions of the invention can also be applied by any conventional method such as brushing, dipping, flow coating, roll coating, conventional and electrostatic spraying. Spray techniques are most often used. Typically, film thickness for liquid coatings can range between 0.1 and 5 mils, such as between 0.1 and 1 mil, or about 0.4 mils.

Generally, after application of the coating composition, the coated substrate is baked at a temperature sufficient to cure the coating. Metallic substrates with powder coatings are typically cured at a temperature ranging from 250° F. to 500° F. (121.1° C. to 260.0° C.) for 1 to 60 minutes, or from 300° F. to 400° F. (148.9° C. to 204.4° C.) for 15 to 30 minutes.

Several liquid formulations can be cured at ambient temperature, such as those using a polyisocyanate or polyanhydride curing agent, or they can be cured at elevated temperatures to hasten the cure. An example would be forced air curing in a down draft booth at about 40° C. to 60° C., which is common in the automotive refinish industry. The ambient temperature curable compositions are usually prepared as a two (2) package system in which the curing agent is kept separate from the composition containing the reactive functional group. The packages are combined shortly before application.

The thermally curable liquid compositions such as those using blocked isocyanate, aminoplast, phenoplast, polyepoxide or polyacid curing agent can be prepared as a one-package system. These compositions are cured at elevated temperatures, typically for 1 to 30 minutes at about 250° F. to about 450° F. (121° C. to 232° C.) with temperature primarily dependent upon the type of substrate used. Dwell time (i.e., time that the coated substrate is exposed to elevated temperature for curing) is dependent upon the cure temperatures used as well as wet film thickness of the applied coating composition. For example, coated automotive elastomeric parts require a long dwell time at a lower cure temperature (e.g., 30 minutes 250° F. (121° C.)), while coated aluminum beverage containers require a very short dwell time at a very high cure temperature (e.g., 1 minute 375° F. (191° C.)).

The coating compositions of the invention are particularly useful as primers and as color and/or clear coats in color-clear composite coatings. The compositions of the invention in the pigmented form can be applied directly to a substrate to form a color coat. The color coat may be in the form of a primer for subsequent application of a top coat or may be a colored top coat. Alternatively, the coating composition of the invention can be unpigmented, in the form of a clearcoat for application over a color coat (either a primer coat or a colored topcoat). When used as a primer coating, thicknesses of 0.4 to 4.0 mils are typical. When used as a color topcoat, coating thicknesses of about 0.5 to 4.0 mils are usual, and when used as a clearcoat, coating thicknesses of about 1.5 to 4.0 mils are generally used.

Accordingly, the present invention is further directed to a substrate coated with one or more of the present compositions. The substrates and compositions, and manner of applying the same, are as described above.

The present invention is further directed to a multi-layer composite coating composition comprising a base coat deposited from a film-forming composition and a topcoat applied over at least a portion of the base coat, where the topcoat is deposited from any of the coating compositions of the present invention. The base coat might have a cured film thickness between about 0.5 and 4 mils (12.5 and 100 micrometers) while the topcoat cured film thickness can be up to 10 mils (250 micrometers). The base coat can be cured before application of the topcoat, or the two coats can be cured together. In one example, the base coat can be deposited from a pigmented film-forming composition, while the topcoat formed from the present compositions is substantially transparent. This is the color-plus-clear system discussed above, frequently used in automotive applications.

In yet another embodiment, the present invention is directed to a method for improving the mar and/or scratch resistance of a coated substrate comprising applying the present compositions to at least a portion of the substrate. Application can be by any means known in the art to the thicknesses described above.

The coatings formed according to the present invention have outstanding appearance properties and scratch and mar resistance properties as compared to no particles being present. Gloss retention percentages following mar and/or scratch testing ranging from about 20 percent up to near 90 percent are achieved, such as 25 percent or greater retention, 60 percent or greater retention, or 80 percent or greater retention. To determine whether improved mar and/or scratch resistance is obtained with the additives of the present invention, two coating compositions can be formulated, with the only difference being that one contains the present additives and one does not. The coatings can be tested for mar and/or scratch resistance (i.e. "mar and/or scratch testing") by means standardly known in the art, such as those described in the Example section below. The results for the additive-containing and nonadditive-containing compositions can be compared to determine whether improved resistance is obtained when the present additives are added. Even a small improvement in any of these tests constitutes an improvement according to the invention.

As used herein, unless otherwise specified, all numbers such as those expressing values, ranges, amounts or percentages may be read as if prefaced by the word "about", even if the term does not expressly appear. Also, any numerical range recited herein is intended to include all sub-ranges subsumed therein. As used herein, the term "polymer" refers to oligomers and both homopolymers and copolymers and the prefix "poly" refers to two or more. Unless stated otherwise, as used herein, molecular weights are number average molecular weights for polymeric materials indicated as "Mn" and obtained by gel permeation chromatography using a polystyrene standard in the art-recognized manner.

EXAMPLES

The following examples are intended to illustrate the invention, and should not be construed as limiting the invention in any way.

For all of the Examples, unless otherwise noted, 20° gloss was measured with a Haze-gloss Reflectometer Model 4601 available from BYK-Gardner.

1, 2, and 9μ 3M abrasive paper mar resistance testing ("1, 2 or 9μ Paper") were performed using an Atlas AATCC Mar Tester, Model CM-5, available from Atlas Electrical Devices Company, Chicago, Ill. A 2"×2" piece of Abrasive Paper (281Q WETORDRY Production Polishing Paper Sheets from 3M) backed with a felt cloth was clamped to the acrylic finger on the arm of the instrument, and a set of 10 double rubs was run on each panel. The panel was then washed with cool tap water and dried. In the tables below, scratch resistance is the percentage of the 20° gloss that was retained after the surface was scratched by the scratch tester or percent gloss retention. Scratch resistance was measured as: Scratch Resistance=(Scratched Gloss÷Original Gloss)×100.

Steel wool scratch resistance tests were also performed using the Atlas Tester ("steel wool") in the same manner as the mar tests only using a 2"×2" piece of #0 grade steel wool sheet backed with the felt cloth.

Values reported in the tables below for paper and steel wool tests are percent gloss retention.

Example 1

(IX)

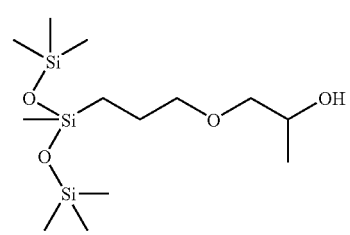

A carbinol functional siloxane having Structure VIII was prepared by hydrosilylation. Specifically, 1.2 parts by weight of 1-allyloxy-2-propanol in the presence of a catalytic amount of chloroplatinic acid (10 ppm platinum as a solution of 7.5% by weight in isopropanol) and 0.004 parts by weight of magnesium silicate was warmed to 80° C. under inert atmosphere. One part by weight 1,1,1,3,5,5,5-heptamethyltrisiloxane was added through an addition funnel over 5 hours. The mixture was treated with 0.02 parts by weight of a 35% solution of aqueous hydrogen peroxide and stirred for two hours at 80° C. Filtration yields [3-[1,3,3,3-tetramethyl-1-[(trimethylsilyl)oxy]disiloxanyl]propoxy]-propanol (CAS# [77623-99-5]) as a water white liquid.

Example 2

A mixture of 1 part by weight CYMEL 303 ((methoxymethyl)melamine-formaldehyde from Cytec Industries, Inc.), 0.75 parts by weight 2,4-di-tert-butylphenol and 0.75 parts by weight xylene was heated to 120° C. in the presence of 0.001 parts by weight p-toluenesulfonic acid under inert atmosphere. The reaction vessel was fitted with a distillation head and distillate was collected at a head temperature of 65° C. until there was no visible hydroxyl peak in the infrared spectrum. To the reaction mixture, 0.45 parts by weight of the siloxane prepared according to Example 1 was added and distillate was collected until there was no visible hydroxyl peak in the infrared spectrum. The acid catalyst was neutralized with the addition of 0.0025 parts by weight of sodium carbonate. The reaction mixture was cooled to 80° C. and 3.1 parts by weight of Nissan MEK-ST (30% colloidal silica in methyl ethyl ketone) were mixed in. Solvents were removed under reduced pressure to yield a solid resinous mixture, referred to as "Additive A" below.

Example 3

Into a two-liter, four-necked reaction kettle equipped with a thermometer, a mechanic stirrer, a nitrogen inlet, and a separator were placed 955.0 parts by weight of hydrogenated Bisphenol-A, 308.0 parts by weight of hexahydrophthalic anhydride, 1.3 parts by weight of di-butyl tin oxide, and 1.3 parts by weight of triisodecylphosphite. The mixture was melted by heating and was further heated to 230° C. while the water resulting from the reaction was removed through the separator. The reaction was stopped when an acid value of two was achieved. The polyester had a hydroxyl number of 160 and Tg around 65° C.

Example 4

A mixture of 1 part by weight CYMEL 300 ((methoxymethyl)melamine-formaldehyde from Cytec Industries, Inc.), 0.36 parts by weight of the polyester prepared according to Example 3, and 0.55 parts by weight xylene were heated to 120° C. in the presence of 0.001 parts by weight p-toluenesulfonic acid under inert atmosphere. The reaction vessel was fitted with a distillation head and distillate was collected at a head temperature of 65° C. until there was no visible hydroxyl peak in the infrared spectrum. To the reaction mixture, 0.23 parts by weight of the siloxane prepared according to Example 1 was added and distillate was collected until there was no visible hydroxyl peak in the infrared spectrum. The acid catalyst was neutralized with the addition of 0.0024 parts by weight of sodium carbonate. The reaction mixture was cooled to 80° C. and 2.37 parts by weight of Nissan MEK-ST were mixed in. Solvents were removed under reduced pressure to yield a solid resinous mixture, referred to as "Additive B" below.

Example 5

Into a five-liter, four-necked reaction kettle equipped with a thermometer, a mechanic stirrer, a nitrogen inlet, and means for removing the by-product (methanol) were placed 1280.0 parts by weight of CYMEL 303, 947.6 parts by weight of 2,4-di-tert-butylphenol, 900.0 parts by weight of xylene, and 1.00 part by weight of p-toluenesulfonic acid. The mixture was heated to 120° C. and the temperature was maintained while the methanol by-product was removed from the system. The reaction progress was monitored by measuring the IR spectra of the mixture and was terminated when the end point was detected. The mixture was subsequently cooled to 100° C.; 184.8 parts by weight of the siloxane prepared as described in Example 1 and 135.5 parts by weight of xylene were added. The mixture was reheated to 120° C. and the methanol by-product was further removed. The reaction progress was continuously monitored by measuring the IR spectra of the mixture and was terminated when an end point was detected. The mixture was then cooled to 100° C. and 2.80 parts by weight of sodium carbonate were added. The mixture was further stirred at 100° C. for one hour before being filtered through a 25 micron filtration bag. Thereafter, half of the mixture was concentrated at a temperature of 100° C. to 130° C. in a vacuum of 3 to 50 mm Hg to remove the xylene solvent. The product thus obtained was a pale yellow solid with a softening temperature of around 67° C., referred to as "Additive C" below. The rest of the filtrate was used as a starting material for the synthesis of Additive D, described in Example 6.

Example 6

Into a two-liter, four-necked reaction kettle equipped with a thermometer, a mechanic stirrer, a nitrogen inlet, and means for removing the solvent were placed 1519.0 parts by weight of the filtrate from the reaction described in Example 5 and 758.1 parts by weight of MEK-ST. The solvent was removed at a temperature of 70° C. to 115° C. in a vacuum of 3 to 50 mm Hg. The product thus obtained was a pale yellow solid with a softening temperature of around 58° C., referred to below as "Additive D".

Example 7

Into a five-liter, four-necked reaction kettle equipped with a thermometer, a mechanic stirrer, a nitrogen inlet, and means for removing the by-product (methanol) were placed 1440.0 parts by weight of CYMEL 303, 844.6 parts by weight of 2,4-di-tert-butylphenol, 1016.0 parts by weight of xylene, and 1.00 part by weight of p-toluenesulfonic acid. The mixture was heated to 120° C. and the temperature was maintained while the methanol by-product was removed from the system. The reaction progress was continuously monitored by measuring the IR spectra of the mixture and was terminated when an end point was detected. The mixture was then cooled to 100° C. and 2.80 parts of sodium carbonate were added. The mixture was further stirred at 100° C. for one hour, and then filtered through a 25 micron filtration bag. Into a two-liter, four-necked reaction kettle equipped with a thermometer, a mechanic stirrer, a nitrogen inlet, and means for removing the solvent were placed 1689.0 parts by weight of the filtrate from the previous step and 844.5 parts by weight of MEK-ST. The solvent was removed at a temperature of 70° C. to 115° C. in a vacuum of 3 to 50 mm Hg. The product thus obtained is a pale yellow solid with a softening temperature of around 70° C., and is referred to as "Additive E".

Example 8

GMA acrylic clear coat compositions identified as Samples 1 to 4 in Table I were prepared using the components and amounts (in grams) shown, and processed in the following manner. The components were blended in a Henschel Blender for 60 to 90 seconds. The mixtures were then extruded through a Werner & Pfleider co-rotating twin screw extruder at a 450 RPM screw speed and an extrudate temperature of 100° C. to 125° C. The extruded material was then ground to a particle size of 20 to 35 microns using an ACM Grinder (Air Classifying Mill from Micron Powder Systems, Summit, N.J.). Cold rolled steel test panels were coated with PPG Black Electrocoat primer ED5051, fully cured, and were obtained from ACT Laboratories. The finished powders were electrostatically sprayed onto test panels and evaluated for coatings properties as further indicated in the table.

TABLE 1

|  | Sample 1 | Sample 2 | Sample 3 | Sample 4 |
|---|---|---|---|---|
| Almatex PD-9060[1] | 403.9 | 403.9 | 403.9 | 403.9 |
| DDDA[2] | 88.8 | 88.8 | 88.8 | 88.8 |
| Additive C[3] | — | — | — | 55.0 |
| Additive D[4] | — | 31.0 | 71.0 | — |
| Benzoin[5] | 1.9 | 1.9 | 1.9 | 1.9 |
| Triphenyl Tin Hydroxide[6] | 5.0 | 5.0 | 5.0 | 5.0 |
| Modaflow[7] | 5.4 | 5.4 | 5.4 | 5.4 |
| Total | 505.0 | 536.0 | 576.0 | 560.0 |
| % melamine | — | 4.7% | 10.1% | 9.8% |
| % silica | — | 1.0% | 2.2% | — |
| Initial gloss | 83.3 | 81.5 | 78.8 | 85.4 |
| 9 μm paper (% retention) | 14.2% | 46.4% | 60.9% | 24.2% |
| 3 μm paper (% retention) | 21.1% | 73.9% | 80.2% | 32.9% |
| 2 μm paper (% retention) | 65.5% | 89.8% | 89.8% | 45.4% |
| Steel Wool (% retention) | 12.6% | 23.3% | 29.1% | 21.4% |

[1] 40% GMA acrylic, commercialy available from Anderson Development.
[2] Dodecanedioic acid, commercially available from DuPont Chemicals.
[3] Siloxane functional melamine.
[4] Siloxane functional melamine with 18% colloidal silica on solids.
[5] Degasser.
[6] Triphenyl tin hydroxide catalyst, commercially available from Atofina Chemicals.
[7] An acrylic copolymer flow additive/anti-crater additive, commercially available from Solutia, Inc.

As can be seen from the results in Table 1, both of the samples containing the present additives (Samples 2 and 3) gave much better mar/scratch resistance than Sample 1, which lacked the additive. Sample 4, which contained the modified aminoplast but not silica, gave results similar to Sample 1, demonstrating that it is the modified aminoplast/silica nanoparticle combination that gives mar and/or scratch resistance.

Example 9

Samples 5 and 6 were prepared and tested as described in Example 8, with the components and amounts (in grams) shown in Table 2.

TABLE 2

|  | Sample 5 | Sample 6 |
|---|---|---|
| Almatex PD-9060 | 403.9 | 403.9 |
| DDDA | 88.8 | 88.8 |
| Additive A[8] | — | 35.0 |
| Benzoin | 1.9 | 1.9 |
| Triphenyl Tin Hydroxide | 5.0 | 5.0 |
| Modaflow | 5.4 | 5.4 |
| Total | 505.0 | 540.0 |
| % melamine | — | 4.5% |
| % silica | — | 1.9% |
| Initial gloss | 83.3 | 83.1 |
| 9 um paper (%) | 14.2% | 59.8% |
| 3 um paper (%) | 21.1% | 81.5% |
| 2 um paper (%) | 65.5% | 89.9% |
| Steel Wool | 12.6% | 39.1% |

[8] Benzoxazine-type melamine with 30% colloidal silica.

As can be seen, the sample containing the present additive (Sample 6) gave improved mar/scratch resistance as compared with the control lacking the present additive (Sample 5).

Example 10

Samples 7 and 8 were prepared and tested as described in Example 8, with the components and amounts (in grams) shown in Table 3.

TABLE 3

|  | Sample 7 | Sample 8 |
|---|---|---|
| Almatex PD-9060 | 403.9 | 403.9 |
| DDDA | 88.8 | 88.8 |
| Additive B[9] | — | 35.0 |
| Benzoin | 1.9 | 1.9 |
| Triphenyl Tin Hydroxide | 5.0 | 5.0 |
| Modaflow | 5.4 | 5.4 |
| Total | 505.0 | 540.0 |
| % melamine | — | 4.5% |
| % silica | — | 1.9% |
| Initial gloss | 83.3 | 82.5 |
| 9 um paper (%) | 14.2% | 26.7% |
| 3 um paper (%) | 21.1% | 51.2% |
| 2 um paper (%) | 65.5% | 83.9% |
| Steel Wool | 12.6% | 43.5% |

[9] Melamine with polyester, 30% colloidal silica.

As can be seen, the sample containing the present additive (Sample 8) gave improved mar/scratch resistance as compared with the control lacking the present additive (Sample 7).

Example 11

Samples 9 and 10 were prepared and tested as described in Example 8, with the components and amounts (in grams) shown in Table 4.

TABLE 4

|  | Sample 9 | Sample 10 |
|---|---|---|
| Almatex PD-9060 | 403.9 | 403.9 |
| DDDA | 88.8 | 88.8 |
| Additive A | — | 35.0 |
| Benzoin | 1.9 | 1.9 |
| Microgrit WCA 3[10] | 1.5 | 1.5 |
| Triphenyl Tin Hydroxide | 5.0 | 5.0 |
| Modaflow | 5.4 | 5.4 |
| Total | 506.5 | 541.5 |
| % melamine | — | 4.5% |
| % silica | — | 1.9% |
| Initial gloss | 83 | 82.7 |
| 9 um paper (%) | 38.1% | 75.7% |
| 3 um paper (%) | 61.7% | 89.8% |
| 2 um paper (%) | 91.0% | 93.8% |
| Steel Wool | 81.6% | 78.4% |

[10] Calcined alumina, median particle size 2.85–3.71 μ, commercially available from Micro Abrasive Corporation.

Sample 10, comprising both the present additive and micro-particulate alumina, performed better overall than Sample 9, comprising the alumina alone.

Example 12

Samples 11 and 12 were prepared and tested as described in Example 8, with the components and amounts (in grams) shown in Table 5.

TABLE 5

|  | Sample 11 | Sample 12 |
|---|---|---|
| Almatex PD-9060 | 403.9 | 403.9 |
| DDDA | 88.8 | 88.8 |

TABLE 5-continued

|  | Sample 11 | Sample 12 |
|---|---|---|
| Additive E | — | 70.0 |
| Benzoin | 1.9 | 1.9 |
| Triphenyl Tin Hydroxide | 5.0 | 5.0 |
| Modaflow | 5.4 | 5.4 |
| Total | 505.0 | 575.0 |
| % melamine | — | 10.0% |
| % silica | — | 2.2% |
| Initial gloss | 83.3 | 83.2 |
| 9 um paper (%) | 14.2% | 42.7% |
| 3 um paper (%) | 21.1% | 70.2% |
| 2 um paper (%) | 65.5% | 91.6% |
| Steel Wool | 12.6% | 67.5% |

Again, Sample 12 containing the present additive had much better mar and scratch resistance as compared with the control Sample 11, which lacked the present additive.

Example 13

A mixture of 587 parts by weight CYMEL 303, 472 parts by weight of the siloxane prepared according to Example 1 and 353 parts by weight SOLVESSO 100 (aromatic solvent, obtained from Exxon) was heated to 120° C. in the presence of 0.05 parts by weight p-toluenesulfonic acid under an inert atmosphere. The reaction vessel was fitted with a distillation head and distillate was collected at a head temperature of 65° C. until there was no visible hydroxyl peak in the infrared spectrum. The acid catalyst was neutralized with the addition of 1.5 parts by weight of sodium carbonate. The reaction mixture was cooled to 80° C., and 1516 parts by weight of Nissan MEK-ST (30% colloidal silica in methyl ethyl ketone) were mixed in. Solvents from the reaction mixture were removed by distillation as the reaction mixture was warmed from 80° C. to 120° C. After the distillation, resin solids were 79 percent; the resulting resin solution is referred to as "Additive F" below.

Example 14

Liquid clearcoat formulations were prepared by using the components and parts by weight (grams) shown in Table 6 below; for the formulations, each component was mixed sequentially with agitation.

It will be appreciated that Sample 13 contained unmodified liquid melamine, Sample 14 the same unmodified liquid melamine and silica, and Sample 15 the additive of the present invention made from the same melamine and silica. The three samples were applied over black electrocoated steel panels. The panels used were cold rolled steel panels (4 inches×12 inches (10.16 cm by 30.48 cm)). The steel panels were coated with ED5051 electrocoat, available from PPG Industries, Inc. These test panels are available as APR28215 from ACT Laboratories, Inc. of Hillsdale, Mich. The clear coating compositions of Samples 13 to 15 were each applied to these test panels using an 8-Path Wet Film Applicator #14 available from Paul N. Gardner Company, Inc. to a target dry film thickness ("DFT") of about 1.5 mils (about 38 micrometers). All coatings were allowed to air flash at ambient temperature about 10 minutes. Panels prepared from each coating were baked horizontally for 30 minutes at 285° F. (141° C.) to cure the coating.

TABLE 6

|  | Sample 13 | Sample 14 | Sample 15 |
|---|---|---|---|
| Methyl n-amyl ketone | 40.0 | 15.4 | 40.0 |
| Acrylic resin[11] | 102.4 | 102.4 | 102.4 |
| Melamine[12] | 35.0 | 35.0 | — |
| Poly-butyl acrylate[13] | 0.5 | 0.5 | 0.5 |
| Dodecyl benzene sulphonic acid[14] | 1.4 | 1.4 | 1.4 |
| Colloidal silica[15] | — | 50.1 | — |
| Additive F | — | — | 65.69 |
| Initial gloss | 87 | 87 | 83 |
| 9µ paper | 57 | 72 | 77 |
| % gloss retention | 66 | 83 | 93 |

[11](14.5% n-butyl methacrylate 14.9% n-butyl acrylate, 20.4% hydroxyethyl methacrylate, 27.6% isobornylmethacrylate, 22.6% hydroxypropyl methacrylate) 63.4% solids in propylene glycol monomethyl ether and SOLVESSO Aromatic 100 (Exxon).
[12]CYMEL 303, available from Cytec Industries, Inc.
[13]A flow control agent having a weight average molecular weight of about 6700 and an Mn of about 2600 made in xylene at 62.5% solids, available from DuPont.
[14]Solution of 70% Dodecylbenzenesulphonic acid in n-propanol.
[15]MEK-ST colloidal silica in methyl ethyl ketone, available from Nissan Chemical.

As can be seen in Table 6, the additive of the present invention, when used in a liquid coating, gave improved mar/scratch resistance as compared with controls (Samples 13 and 14).

Example 15

A mixture of 483 parts by weight of CYMEL 303, 155 parts by weight of 2,4-di-t-butylphenol, 138 parts by weight of saccharin and 254 parts by weight of xylene was heated to 120° C. in the presence of 0.31 parts by weight of p-toluenesulfonic acid under inert atmosphere. The reaction vessel was fitted with a distillation head and distillate was collected at a head temperature of 65° C. until there was no visible hydroxyl peak in the infrared spectrum. To the reaction mixture, 209 parts by weight of the siloxane prepared according to Example 1 was added and distillate was collected until there was no visible hydroxyl peak in the infrared spectrum. The reaction mixture was cooled to 80° C. and 1408 parts by weight of Nissan MEK-ST (30% colloidal silica in methyl ethyl ketone) were mixed in. Solvents were removed under reduced pressure to yield a solid resinous mixture, referred to as "Additive G" below.

Example 16

A mixture of 483 parts by weight of CYMEL 303, 276 parts by weight of saccharin and 310 parts by weight of xylene was heated to 120° C. in the presence of 0.38 parts by weight of p-toluenesulfonic acid under inert atmosphere. The reaction vessel was fitted with a distillation head and distillate was collected at a head temperature of 65° C. until there was no visible hydroxyl peak in the infrared spectrum. To the reaction mixture, 209 parts by weight of the siloxane prepared according to Example 1 was added and distillate was collected until there was no visible hydroxyl peak in the infrared spectrum. The reaction mixture was cooled to 80° C. and 1383 parts by weight of Nissan MEK-ST (30% colloidal silica in methyl ethyl ketone) were mixed in. Solvents were removed under reduced pressure to yield a solid resinous mixture, referred to as "Additive H" below.

Example 17

Samples 16 through 18 were prepared and tested as described in Example 8, with the components and amounts (in grams) shown in Table 7. As demonstrated in Table 7, Samples 17 and 18 containing the present additive, gave much better results than the control, Sample 16, which lacked the additive.

TABLE 7

|  | Sample 16 | Sample 17 | Sample 18 |
| --- | --- | --- | --- |
| Almatex PD-9060 | 403.9 | 403.9 | 403.9 |
| DDDA | 88.8 | 88.8 | 88.8 |
| Additive G | — | 35.0 | — |
| Additive H | — | — | 35.0 |
| Benzoin | 1.9 | 1.9 | 1.9 |
| Triphenyl Tin Hydroxide | 5.0 | 5.0 | 5.0 |
| Modaflow | 5.4 | 5.4 | 5.4 |
| Total | 505.0 | 540.0 | 540.0 |
| % melamine | — | 4.5% | 4.5% |
| % silica | — | 1.9% | 1.9% |
| Initial gloss | 83.3 | 84.5 | 85.1 |
| 9 um paper (%) | 14.2% | 49.5% | 37.5% |
| 3 um paper (%) | 21.1% | 75.9% | 58.5% |
| 2 um paper (%) | 65.5% | 88.6% | 86.7% |
| Steel Wool | 12.6% | 71.2% | 55.5% |

Example 18

Samples 19 through 21 were prepared and tested as described in Example 8, with the components and amounts (in grams) shown in Table 8.

As demonstrated in Table 8, a higher concentration of the present additive (Sample 21) gave overall better results than a lower concentration (Sample 20), with both being markedly better than the control (Sample 19), which lacked the present additive.

TABLE 8

|  | Sample 19 | Sample 20 | Sample 21 |
| --- | --- | --- | --- |
| Almatex PD-9060 | 403.9 | 403.9 | 403.9 |
| DDDA | 88.8 | 88.8 | 88.8 |
| Additive D | — | 31.0 | 71.0 |
| Benzoin | 1.9 | 1.9 | 1.9 |
| Triphenyl Tin Hydroxide | 5.0 | 5.0 | 5.0 |
| Modaflow | 5.4 | 5.4 | 5.4 |
| Total | 505.0 | 536.0 | 576.0 |
| % melamine | — | 4.7% | 10.1% |
| % silica | — | 1.0% | 2.2% |
| Initial gloss | 83.3 | 81.5 | 78.8 |
| 9 μm paper (% retention) | 14.2% | 46.4% | 60.9% |
| 3 μm paper (% retention) | 21.1% | 73.9% | 80.2% |
| 2 μm paper (% retention) | 65.5% | 89.8% | 89.8% |
| Steel Wool (% retention) | 12.6% | 23.3% | 29.1% |

Whereas particular embodiments of this invention have been described above for purposes of illustration, it will be evident to those skilled in the art the numerous variations of the details of the present invention may be made without departing from the invention as defined in the appended claims.

Therefore, we claim:

1. An additive comprising a mixture of:
   a) an aminoplast;
   b) silica particles having an average particle size below one micron dispersed in organic solvent, and
   c) a functional siloxane having the following structure:

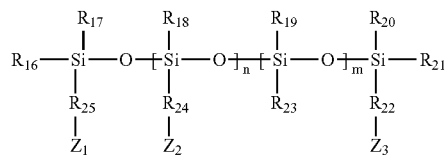

wherein $R_{16}$, $R_{17}$, $R_{18}$, $R_{19}$, $R_{20}$, $R_{21}$, and $R_{23}$ are each a monovalent hydrocarbon group of 1 to 10 carbon atoms and can be the same or different; $R_{22}$, $R_{24}$, and $R_{25}$ are each a divalent hydrocarbon group of 1 to 24 carbon atoms and can be the same or different; $Z_1$, $Z_2$, and $Z_3$ are each an active hydrogen group reactive with the aminoplast and can be the same or different; and n and m are 0 to 12,
   wherein component (a) is present in an amount of between 90 and 60 weight percent and component (b) is present in an amount between 10 and 40 weight percent, with the weight percent being based on the total weight of (a) and (b), and
   wherein the additive does not include any other film-forming resin.

2. The additive of claim 1, wherein the aminoplast is liquid at 20° C.

3. The additive of claim 1, wherein the aminoplast is solid at 20° C.

4. The additive of claim 1, wherein the surface of the silica particles has been modified to render the particles more stable in a non-hydroxy solvent than they would be absent the modification.

5. The additive of claim 1, wherein the functional siloxane is [3-[1,3,3,3-tetramethyl-1-[(trimethylsilyl)oxy]disiloxanyl]propoxy]-propanol.

6. The additive of claim 1, wherein n is 1, m is 0 to 3, $R_{16-21}$ are each a monovalent hydrocarbon group of 1 to 10 carbon atoms and can be the same or different, wherein at least one of $R_{16-21}$ is methyl, $R_{24}$ is an aliphatic ether or polyether, $R_{22}$ and $R_{25}$ are methylene, $Z_1$ is hydrogen, $Z_2$ is an alcohol, and $Z_3$ is hydrogen.

7. A method for making a coating composition, comprising:
   a) preparing the additive of claim 1; and then
   b) adding the additive to a film forming resin.

8. The method of claim 7, wherein the coating composition is a liquid coating composition.

9. The method of claim 7, wherein the coating composition is a powder coating composition.

10. The method of claim 7, wherein the silica particles have an average particle size of below 800 nanometers and further comprising a plurality of particles having an average particle size of 0.1 to 10 microns.

11. A method for improving the scratch and/or mar resistance of a substrate comprising:
   (a) preparing a coating composition according to the method of claim 7, and then
   (b) applying the coating composition to at least a portion of the substrate.

12. The method of claim 11, wherein an intervening layer is applied to the substrate prior to the application of the coating composition.

13. The method of claim 7, wherein the coating composition, when cured and subjected to mar and/or scratch testing, has a greater 20 degree gloss retention, as measured with a Haze-gloss Reflectometer, than a coating with no additive.

14. The method of claim 13, wherein the 20 degree gloss retention, as measured with a Haze-gloss Reflectometer, after mar and/or scratch testing is 25 percent or greater.

15. The method of claim 13, wherein the 20 degree gloss retention, as measured with a Haze-gloss Reflectometer, after mar and/or scratch testing is 60 percent or greater.

16. The method of claim 13, wherein the 20 degree gloss retention, as measured with a Haze-gloss Reflectometer, after mar and/or scratch testing is 80 percent or greater.

17. An additive comprising a mixture of:
 a) an aminoplast;
 b) silica particles having an average particle size below one micron dispersed in organic solvent, and
 c) a functional siloxane having the following structure:

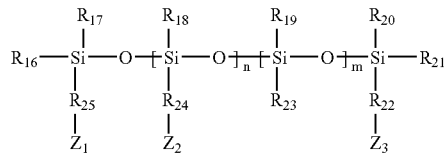

wherein $R_{16}$, $R_{17}$, $R_{18}$, $R_{19}$, $R_{20}$, $R_{21}$, and $R_{23}$ are each a monovalent hydrocarbon group of 1 to 10 carbon atoms and can be the same or different; $R_{22}$, $R_{24}$, and $R_{25}$ are each a divalent hydrocarbon group of 1 to 24 carbon atoms and can be the same or different; $Z_1$, $Z_2$, and $Z_3$ are each an active hydrogen group reactive with the aminoplast and can be the same or different; and n and m are 0 to 12,
 wherein the aminoplast is present in an amount sufficient to disperse the silica in the resulting mixture and the silica comprises between 10 and 40 weight percent of the additive, and
 wherein the additive does not include another film-forming resin.

18. A method for making a coating composition, comprising:
 a) preparing the additive of claim 17; and then
 b) adding the additive to a film forming resin.

19. A method for preparing an additive, comprising mixing together:
 a) an aminoplast;
 b) silica particles having an average particle size below one micron dispersed in organic solvent, and
 c) a functional siloxane having the following structure:

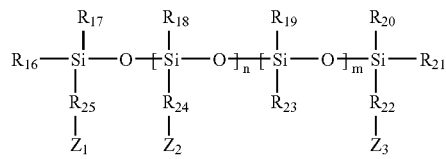

wherein $R_{16}$, $R_{17}$, $R_{18}$, $R_{19}$, $R_{20}$, $R_{21}$, and $R_{23}$ are each a monovalent hydrocarbon group of 1 to 10 carbon atoms and can be the same or different; $R_{22}$, $R_{24}$, and $R_{25}$ are each a divalent hydrocarbon group of 1 to 24 carbon atoms and can be the same or different; $Z_1$, $Z_2$, and $Z_3$ are each an active hydrogen group reactive with the aminoplast and can be the same or different; and n and m are 0 to 12,
 wherein component (a) is present in an amount of between 90 and 60 weight percent and component (b) is present in an amount between 10 and 40 weight percent, with the weight percent being based on the total weight of (a) and (b)), and
 wherein the additive does not include any other film-forming resin.

20. The method of claim 19, wherein the aminoplast is liquid at 20° C.

21. The method of claim 19, wherein the aminoplast is solid at 20° C., and is dissolved or dispersed in an organic solvent.

22. The method of claim 19, wherein the organic solvent is removed and a solid additive formed thereby.

23. A method for making a coating composition, comprising:
 a) preparing the additive of claim 19; and then
 b) adding the additive to a film forming resin.

* * * * *